United States Patent [19]

Gibbs

[11] 3,924,366
[45] Dec. 9, 1975

[54] EASILY ERECTED ROOF STRUCTURE FOR MODULAR BUILDINGS

[76] Inventor: Louis L. Gibbs, 1547 Silverglade Court, Cincinnati, Ohio 45240

[22] Filed: Aug. 26, 1974

[21] Appl. No.: 500,572

[52] U.S. Cl. .......................... 52/69; 52/70; 52/127; 52/143; 214/75 H; 214/515
[51] Int. Cl.² ..................... E04B 1/343; E04B 1/344
[58] Field of Search .............. 52/64, 66, 67, 68, 69, 52/70, 71, 126, 143, 641; 214/75 H

[56] References Cited
UNITED STATES PATENTS

| | | | |
|---|---|---|---|
| 1,124,212 | 1/1915 | Cromley | 52/69 |
| 1,861,548 | 6/1932 | Peck | 52/69 |
| 2,927,704 | 3/1960 | Condon | 214/75 H |
| 3,097,013 | 7/1963 | Mussler | 52/69 |
| 3,460,297 | 8/1969 | Fritz | 52/143 |
| 3,557,500 | 1/1971 | Schmidt et al. | 52/109 |
| 3,591,990 | 7/1971 | Bergstedt | 52/67 |

FOREIGN PATENTS OR APPLICATIONS

| | | | |
|---|---|---|---|
| 587,824 | 5/1947 | United Kingdom | 52/66 |

Primary Examiner—Frank L. Abbott
Assistant Examiner—William Randolph
Attorney, Agent, or Firm—Wood, Herron & Evans

[57] ABSTRACT

An easily erected roof structure designed to be transported in a conventional trailer truck, which is particularly adapted for use in relatively low cost modular buildings. The roof structure has a centrally located roof section with two side roof sections hinged to opposite sides of the central section. During transportation the central roof section is disposed horizontally proximate the top of the trailer, and the side roof sections are parallel to the trailer side walls, extending substantially vertically downward from the central section to which they are hinged with the lower edges of the side sections resting on the bed of the trailer. Mounted underneath the central section are permanent support legs which are disposed, during transportation, in a folded or parked position spaced above and clear of the bed of the truck. The roof structure is unloaded from the truck by rolling or sliding the lowermost edges of the side sections along the trailer floor. As the structure emerges from the trailer, the support legs, which are mounted underneath the central section, are swung into a vertical position, transferring support of the structure to the ground. Once the roof structure is fully unloaded from the truck, the support legs are permitted to telescope inwardly under the weight of the roof structure. The telescoping movement, through a suitable linkage assembly such as a cable/linkage assembly or temporary supports, is utilized to raise the side sections from the substantially vertical position exhibited during transport in the trailer to a substantially horizontal or erect position, whereat the side roof sections form an extension of the roof surface of the central section.

9 Claims, 20 Drawing Figures

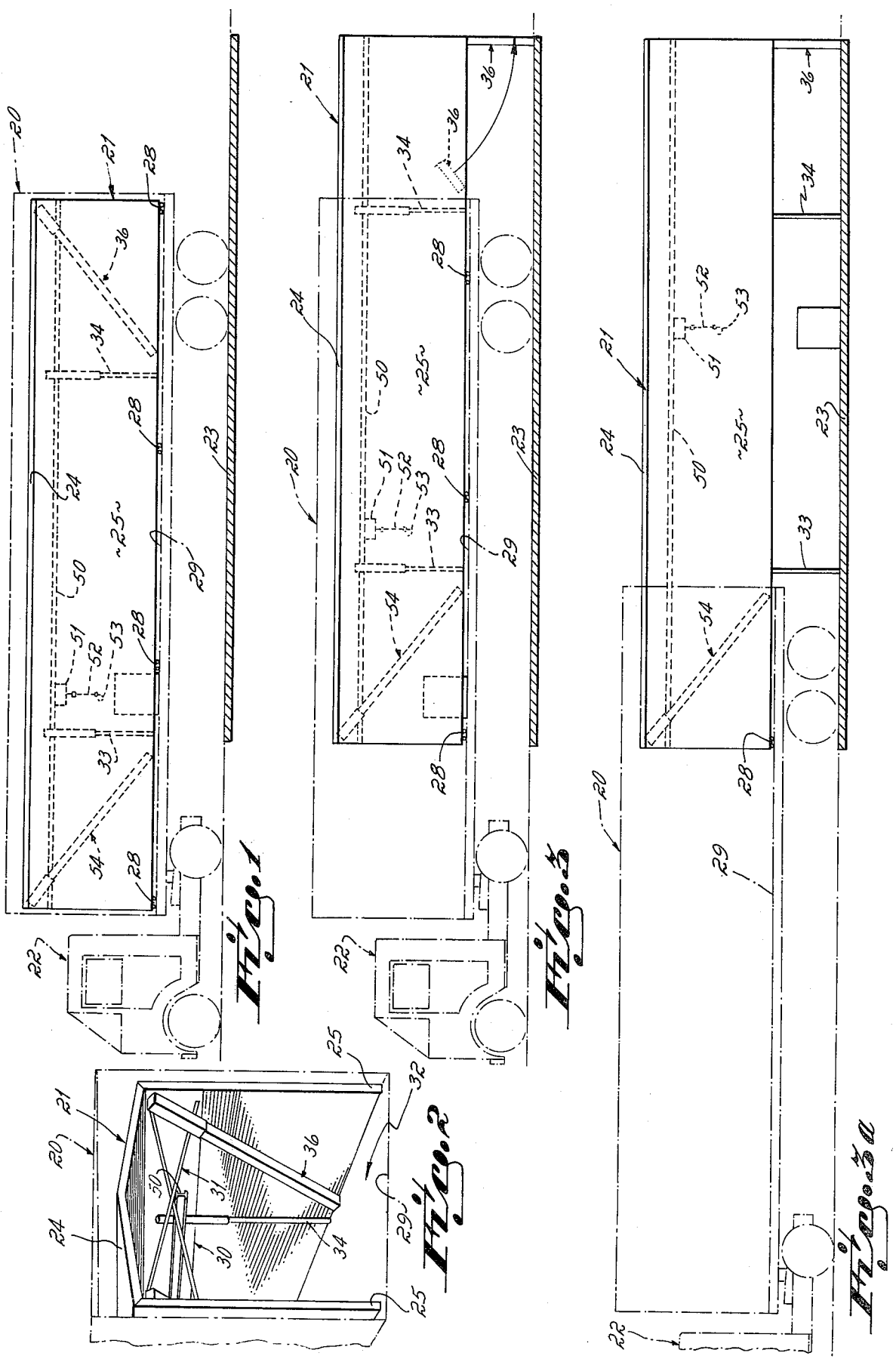

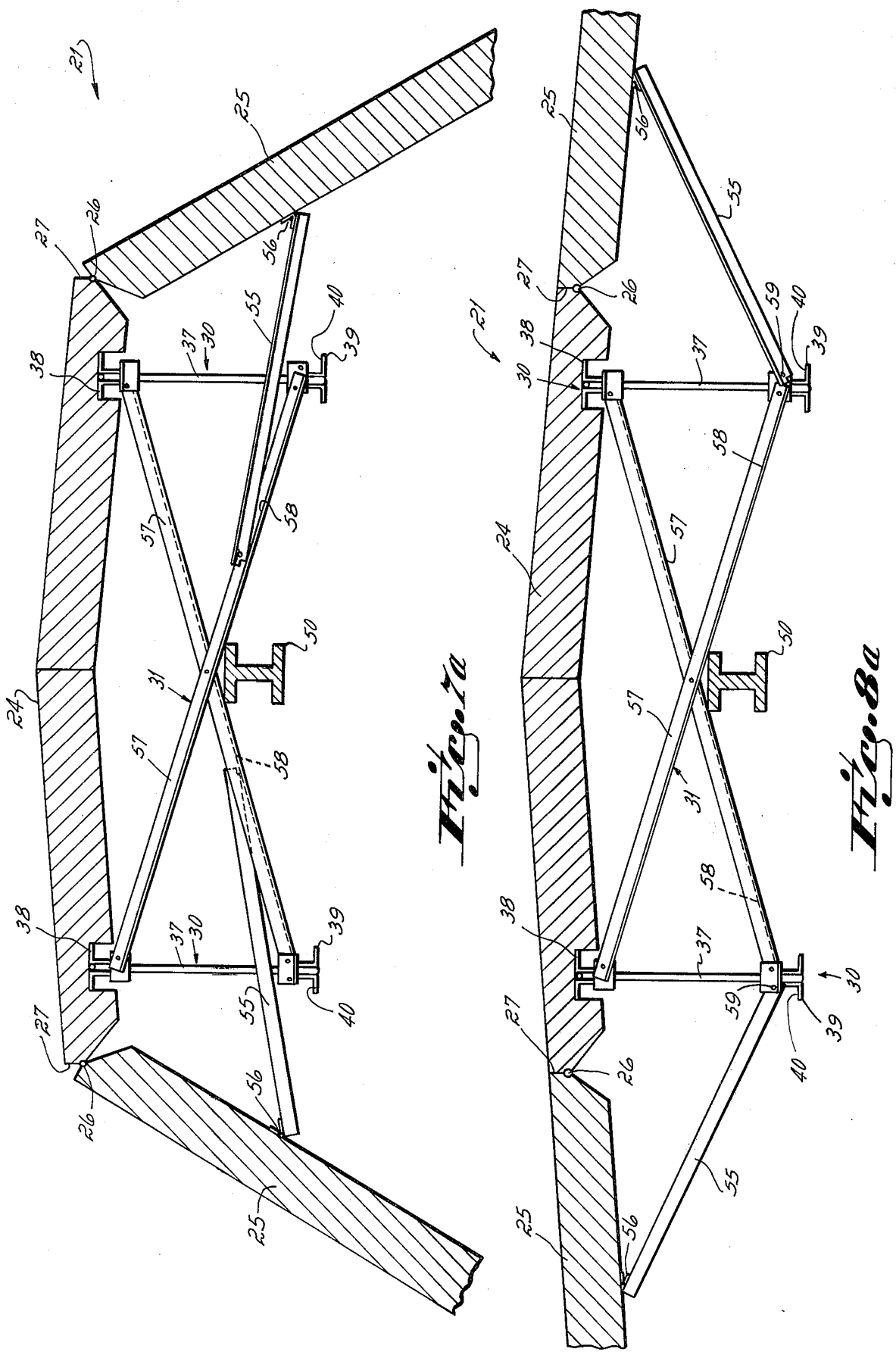

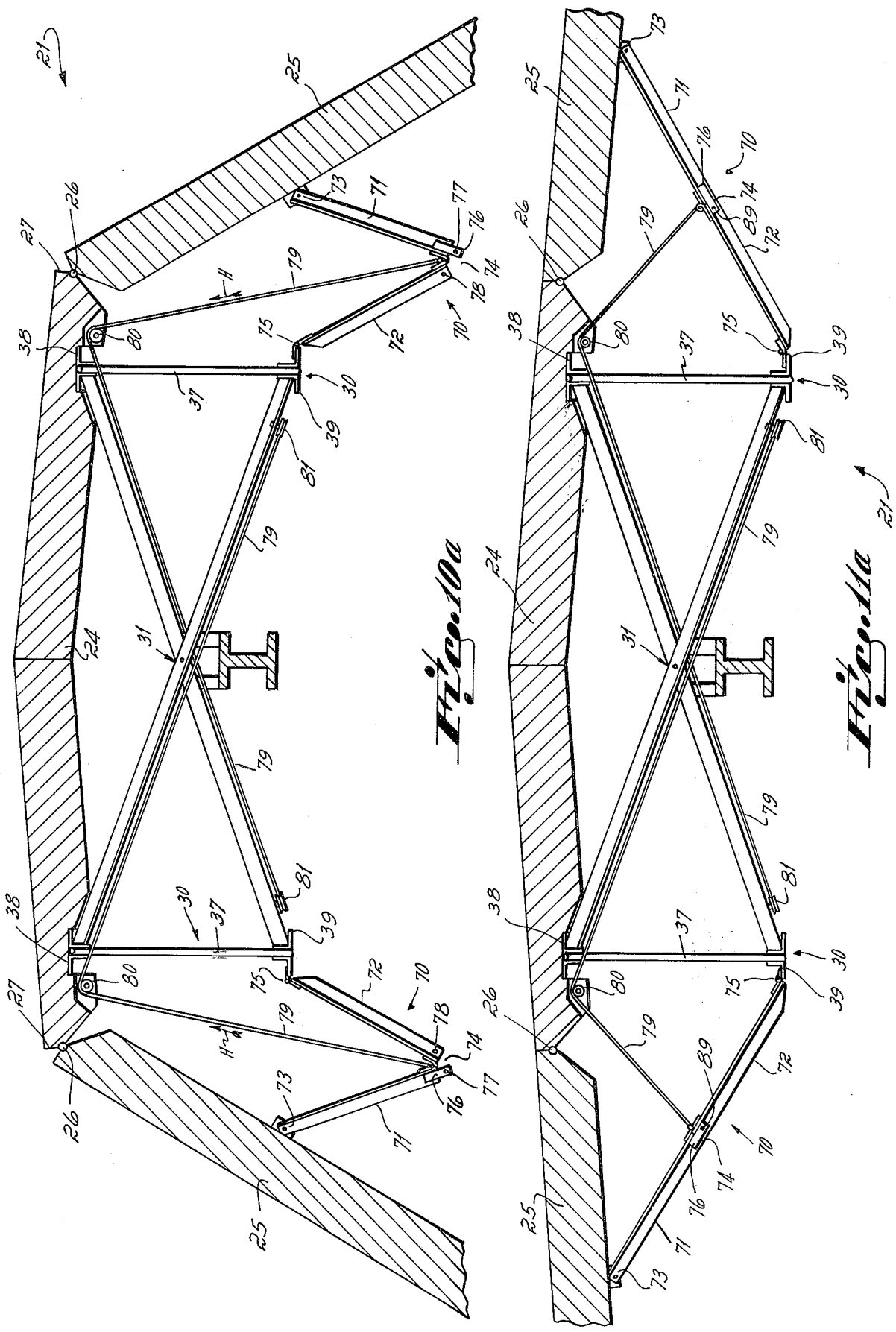

3,924,366

EASILY ERECTED ROOF STRUCTURE FOR MODULAR BUILDINGS

BACKGROUND OF THE INVENTION

This invention relates generally to the field of buildings and more particularly to an easily transported and relatively low-cost roof structure for modular buildings.

In recent years, the cost of conventional on-site construction of buildings has risen at a very rapid rate. The need for low-cost buildings has, consequently, increased. In response to this ever increasing need for low-cost buildings, numerous manufacturers of mobile and modular homes and buildings have developed mobile structures in an effort to meet this need. The mobile home and building manufacturers have generally built structures having a substantially long, narrow rectangular floor plan. These mobile homes and buildings are typically provided with permanent or removable wheels so that the home or building can be towed by a truck from the factory to the customer's home or building site.

In most instances, by completely fabricating the building at the factory, construction cost is reduced because mass production techniques can be used. Site preparation costs for plumbing, electric and gas hookup, and transportation, while additional to the factory fabrication cost, nevertheless result in a net cost to the customer for a completed mobile home which generally is less than the cost of constructing on site a comparable sized home by conventional techniques.

The principal drawback of such factory-constructed mobile homes and buildings, however, is that their size is somewhat restricted due to the fact that the home must be transported, fully assembled, to the building site and, consequently, the structure must comply with highway restrictions on load width and length if transportation is to be via the highways which is customarily the case. To overcome this problem, some modular buildings are manufactured in two sections. The fully assembled one-half sections are separately transported to the building site whereat they are connected together to form a larger structure.

While the approach of building modular buildings in fractional sections at the factory and thereafter assembling these sections into a larger building at the site has somewhat overcome the size problem of typical mobile homes, this approach, however, has given rise to a significant increase in transportation and on-site costs. Since the one-half sections are generally oversized loads, transportation permits are needed and special transportation rates apply so the cost of shipping each section may be very high compared to rates for conventional trailer trucks. Furthermore, once the sections reach the building site, skilled workmen and often special equipment are required to connect the building sections together. As such, the customer cost of sugh modular structures becomes higher and much of the savings of factory mass production is lost. Indeed, it is economically unfeasible to transport such buildings any great distance from the point of manufacture, 300 miles being generally considered to be the maximum feasible distance to ship such buildings.

Other prior art modular buildings have included folding roof sections which, during transportation via a conventional trailer truck or a flat bed truck are positioned so as to reduce the size of the roof. Once at the building site, the roof sections are unfolded so as to form a building with a significantly larger roof size than could be transported via a conventional trailer truck or flat bed truck.

While buildings of this type overcome the problems of building size outlined above, they do present a special problem of their own in that special equipment is needed at the building site for unloading and to raise the folding roof sections. In some dedigns, cranes or other power equipment are needed on site to raise the folded roof sections to their final position. In other designs, the building is equipped with winches or other hand or power operated lifting mechanisms which normally are part of the building, thus adding to the cost.

Still other prior art modular buildings are fabricated in units of box-like rooms or building sections comprised of walls, floor and roof which are individually transported to the site, usually as oversized loads at correspondingly high rates. At the site, heavy rigging equipment such as a crane is required to unload and position the sections together to form a complete building. Transportation and erection costs involved with this approach have proven so high as to make the approach impractical for most applications. Furthermore, this type of modular construction does not lend itself to relocation of the building once erected, should this be a consideration.

Therefore, in view of the foregoing difficulties, it is the primary objective of the invention to provide a relatively low cost, easily and inexpensively transported roof structure for use in a modular building which can be assembled easily and inexpensively at any desired site, and subsequently relocated if desired, with a minimum of workmen and special equipment.

It is a further objective of the invention to provide a roof structure for modular buildings which is easily transported in a folded state in a single conventional trailer truck, and which is self-erecting at the desired site to form a structure significantly larger than was heretofore transportable in a single trailer truck.

It is a further objective of the invention to provide a roof structure for modular buildings which is easily transported in a folded state in a single conventional trailer truck, and which is self-erecting at the desired site to form a structure significantly larger than was heretofore transportable in a single trailer truck, and which is self-retracting into the folded configuration for transportation to another site.

In achieving these objectives, the invention is predicated, in part, on the concept of providing a folding roof structure which can be transported inside a conventional trailer and which is self-erecting as well as self-retracting at the building site.

In a preferred embodiment of the invention, the roof structure includes a central roof section having a width approximately equal to the interior width of a conventional trailer. The central roof section has two opposed side edges to which side roof sections which are slightly less in width than the interior height of the trailer, are pivotally joined. These side roof sections, when the structure is in a folded position for shipment, hang down from the horizontally disposed center section in a generally vertical disposition with the lowermost edges thereof resting on rollers, slides or the like so that the structure can be easily rolled, slid or otherwise moved into or out of a trailer. As such, the structure can be transported in a conventional trailer at standard rates rather than higher special rates which frequently apply for wide loads.

Mounted underneath the central roof section are permanent legs which can be folded upwardly during transportation so as not to contact the floor of the trailer. As the roof structure is removed from the trailer at the building site, the permanent legs are folded downwardly to provide support therefor from the ground.

The permanent support legs are constructed to telescope so that the central roof section can be lowered slightly with respect to the ground, or other support surface at the construction site. A side roof pivoting means, which in one form comprises temporary support legs pivotally attached to the underside of the side roof sections and extending therefrom to the ground, are utilized to convert the telescoping movement of the permanent legs, produced by slightly lowering the central roof section, into pivotal movement of the side roof sections to swing them upwardly from the depending folded position characteristic of shipment to their horizontal position typical of the assembled structure. An advantage of this arrangement is that the side roof sections swing from their vertical, intransit position to their erected, horizontal position with a minimum of men and without requiring any special equipment.

Once the roof is in its erected position, lightweight panelized or modular walls can be positioned to enclose the building. These walls are easily positioned by two workmen using only hand tools. Thus, the on-site costs of a building using the roof structure of the invention is kept to a minimum.

It is yet another objective of the invention to provide a roof structure for a modular building which can be transported in a conventional trailer truck in a manner such that the walls and applicances for the building, can also be transported therein, and further in a manner which facilitates with a minimum specialized lifting apparatus, site unloading of all walls and appliances from the trailer truck.

In accordance with this objective, the roof structure of the invention is folded in the trailer during transportation much like a drop-leaf table with the leaves folded down. In this way, the central and side roof sections are adjacent the trailer top and sides, respectively, leaving substantially the entire volume of the trailer available for storing the building walls, appliances and the like.

In addition, since in this transport condition the horizontally disposed central roof section spans and is supported by the vertically disposed side roof sections, a travelling hoist can be secured to the underside of the central roof structure for travel along the longitudinal axis thereof. Once the roof structure is partly removed from the trailer truck at the desired site, the hoist can be used to lift transported cartons stored in the trailer containing walls, appliances, etc. from inside the trailer and move them onto the building pad or ground surface at the building site. In this manner, a conventional trailer truck can transport an entire modular building including appliances therefor, and such can be unloaded and the building erected at the desired site by few workmen without additional on-site equipment. Likewise, the erection process can be reversed and the folded roof and other components reloaded without additional on-site equipment for transportation to another site.

BRIEF DESCRIPTION OF THE DRAWINGS

The foregoing and other objects of the invention will become more clear from the following detailed description of preferred embodiments of the invention taken in connection with the drawings which form a part of the disclosure wherein:

FIG. 1 is a side elevational view of a trailer, in phantom lines, showing a side elevational view of the roof structure of this invention in its folded position;

FIG. 2 is a rear perspective view of the trailer with the roof structure of the invention disposed therein in its folded condition;

FIG. 3 is a side elevational view of the roof structure, showing the structure partially removed from the trailer to a position where it is partially supported on the ground by a first set of permanent legs and where large cartons, from within the truck, can be unloaded onto the support surface at the building site with the travelling hoist;

FIG. 3a is a side elevational view of the roof structure, showing the trailer after it has been driven further from under the roof structure so that additional temporary support legs can be extended;

FIG. 7a is a vertical sectional view showing a side section support brace when the roof structure is at a partially erect position as shown in FIG. 7;

FIG. 8a is a vertical section view showing the side section support brace secured in the support position while the roof is in its erect position as shown in FIG. 8;

FIG. 10a is a vertical sectional view showing, in greater detail, the side section support mechanism in its partially erect position;

FIG. 11a shows a vertical sectional view showing, in detail, the side section support mechanism in its fully erect position;

DETAILED DESCRIPTION

Figure 4:
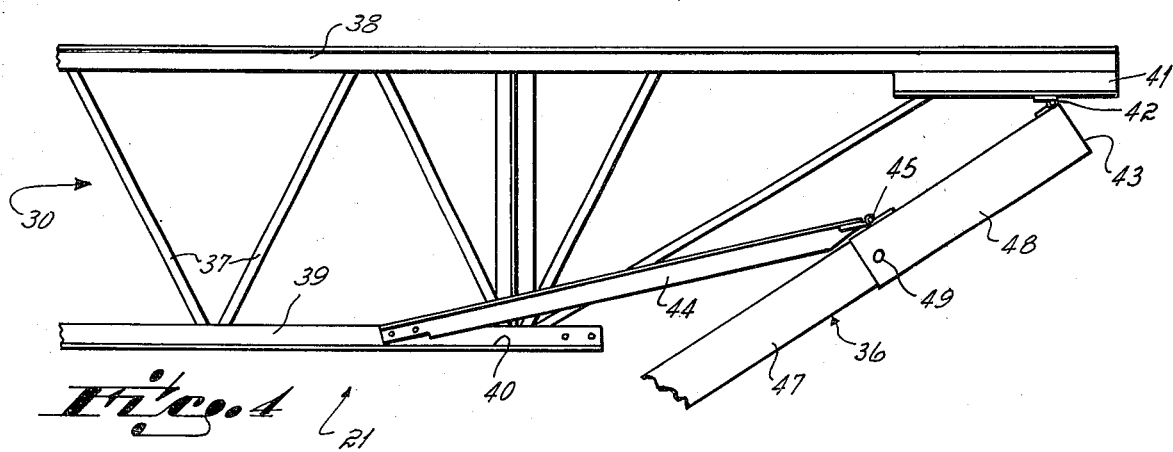
FIG. 4 is a side elevational view of a portion of a main support leg disposed at its parked or folded position.

Referring first to FIG. 1, a conventional trailer 20 is shown with a roof structure 21 of the invention loaded inside the trailer 20. The trailer 20 has an elongated rectangular floor with a floor-to-ceiling height slightly greater than the width of the trailer. The trailer 20 itself is powered by a conventional trailer tractor or truck, shown generally at 22.

The building site, whereat a building including the roof structure 21 of the present invention is to be assembled, typically has a concrete slab or the like 23 onto which the trailer 20 is driven. While a concrete slab 23 is the preferred foundation for a building which includes the roof structure of the invention, other foundations including the ground may be utilized so long as a trailer 20 can be driven thereon and the roof structure 21 unloaded in a manner hereinafter described in greater detail. Alternatively, a specially prepared low wall foundation may be utilized, with or without basement, but special equipment is required to slide the roof structure out of the trailer onto the foundation.

The roof structure 21, as shown in FIG. 2, has a central horizontally disposed section 24 and two side sections 25 hinged at 26 along opposed edges 27 of the central section 24. The side sections 25, in their folded condition in the trailer 20, extend downwardly in a generally vertical plane and the lowermost edge thereof rests on rollers, shown generally at 28 in FIG. 1. The rollers 28 are disposed between the side sections 25 and the trailer floor 29 so that the roof structure 21 can be easily rolled into or out of the trailer 20. It will be recognized by those skilled in the art that the rollers 28 can be replaced by slides or the like so long as the roof structure 21 can be easily moved in or out of a trailer.

The roof structure 21, as viewed in FIGS. 1 and 2, is shown in its folded position whereat the central roof section 24 is disposed in a substantially horizontal plane and the side sections 25 are disposed in a generally vertical plane in a configuration much like a drop leaf table with both leaves down. The central roof section itself may be peaked, i.e., having a central ridge line and contiguous surfaces sloping downwardly and away from that ridge line towards either side. While the central roof section 24 preferably has a peaked configuration as shown in FIG. 2, other arrangements may also be employed.

The side sections 25, on the other hand, are preferably substantially planar bodies hinged along opposed edges of the central section 24 to thereby permit the side sections 25 to be swung into an erect position in a manner hereinafter described to form a coextensive roof surface with the central section 24.

Figure 6A:
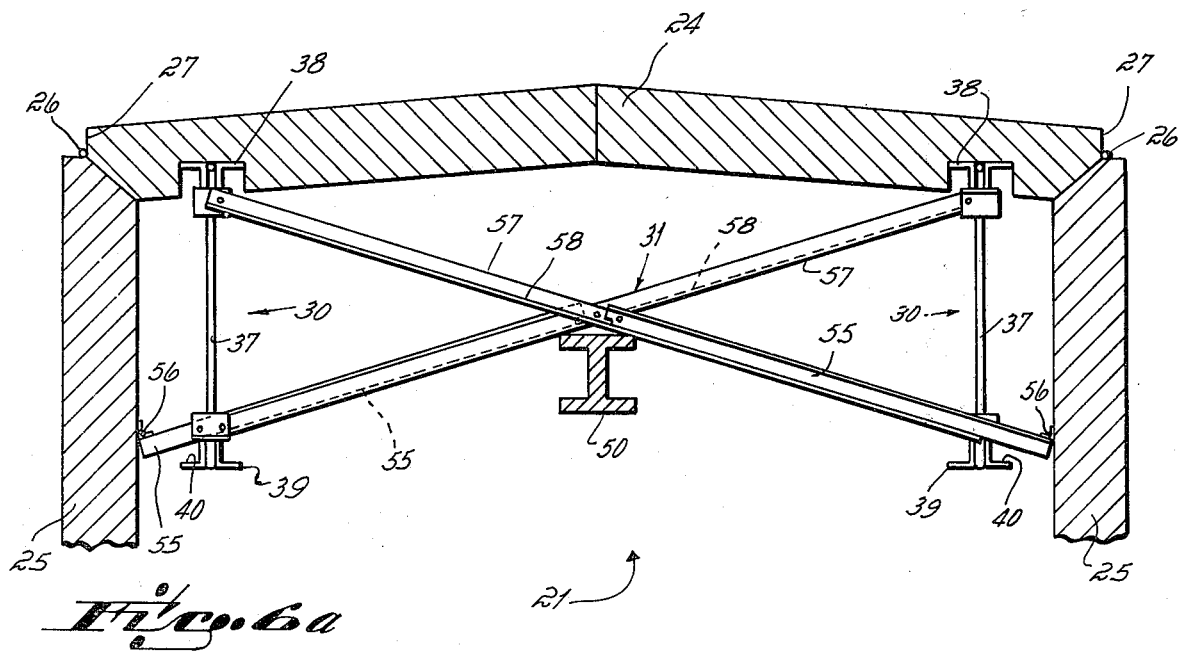
FIG. 6a is a vertical sectional view showing a side roof section support brace when the side sections are folded as shown in FIG. 6.

The roof structure, as viewed in FIG. 6a, includes two elongated beams 30 which each extend along the length and are attached to the underside of the central section 24. The beams 30 are disposed adjacent the opposed edges 27 and provide support for the central section 24. The beams 30 may comprise any suitable beam construction of wood, metal or other material.

In order to provide lateral support for the roof structure, a plurality of X frames or the like, shown generally at 31, are spaced along the length of the roof structure 21 and each X frame 31 is attached, at opposite ends thereof, to the beams 30. While X frames 31 are preferred for providing lateral support to the structure, it will be recognized by those of skill in the art that numerous other constructions can be utilized to provide the desired lateral support in place of the X frames 31.

As viewed in FIG. 2, the roof structure is in its folded position and there is a large open area indicated generally at 32 below the central section 24 and between the side sections 25. This open area 32 can be utilized for storing prefabricated walls, modular rooms such as bathrooms, appliances and the like for the building. Indeed, sufficient space is provided in this open area 32 to permit storage of all the necessary parts to construct a complete building utilizing the roof structure 21.

The roof structure 21, as indicated earlier, can be unloaded from a trailer 20 at the building site without requiring special unloading equipment. The roof structure 21 is unloaded in the following manner. Since the lowermost edge of each side section 25 rests on rollers 28 or other means, the roof structure 21 can be easily rolled from the trailer 20.

Figure 5:
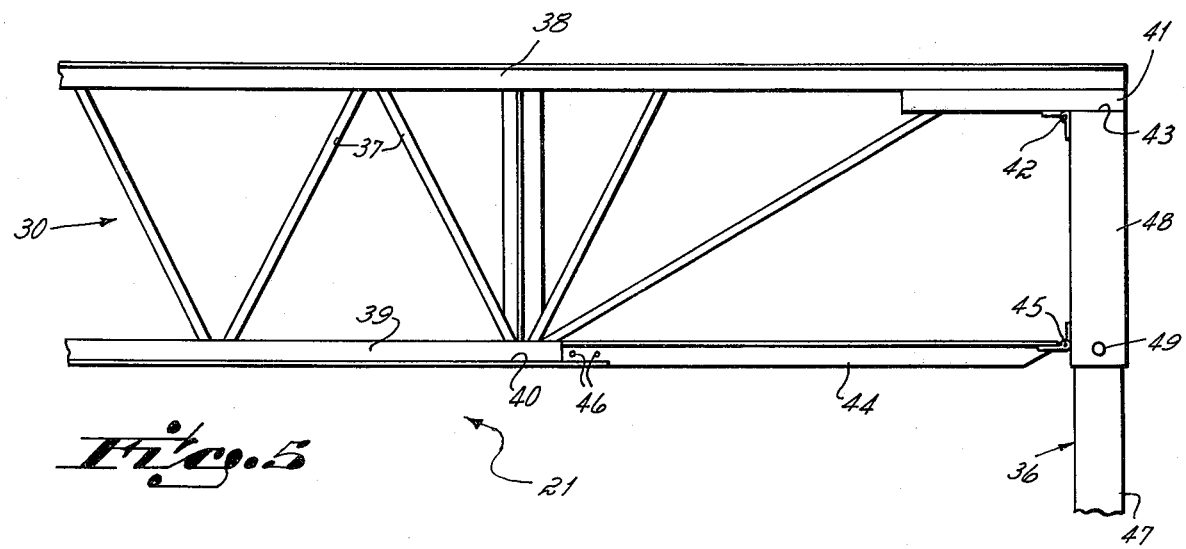
FIG. 5 is a side elevational view of a portion of a main support leg after it has been swung into position for supporting the roof structure.

With the trailer 20 in proper position on the slab 23 the roof structure 21 is rolled partially out of the trailer 20 to a position where the rearmost main support legs 36 are clear of the trailer 20, as shown, for example, in FIG. 3. The rearmost main support legs 36 are swung from their folded or parked position as illustrated in FIGS. 1, 2 and 4 to their vertical or supporting position as illustrated by FIGS. 3 and 5. The swinging of the legs from their folded or parked position to their vertical or supporting position is facilitated by the pivotal connection of the permanent support legs 36 to the roof structure 21 as shown in greater detail in FIGS. 4 and 5.

The main support legs 36 are preferably secured to the slab 23 and the trailer 20 is then driven out from under the roof structure 21 to a point where the temporary support legs 33 and 34 are clear of the trailer 20. When at this position as shown, for example, in FIG. 3a, temporary telescoping support legs 33 and 34 are extended downwardly from the structure 21 to rest on the upper surface of the slab 23. The legs 33, 34 are preferably pivoted as indicated generally at 35 in FIG. 6 to the underside of each side section 25. This pivot point 35 is disposed inward of the side section hinge indicated generally at 26. As such a toggle action exists to keep the side section 25 in its folded position. After being extended to contact the slab 23, the legs 33 and 34 are then secured against further telescoping to thereby temporarily support the roof structure 21 so that the truck may drive the rest of the way out from under the load and depart the site. In an alternative embodiment of the invention, as described more particularly in connection with FIGS. 9-13, the legs 33 and 34 are rigidly attached to the side sections 25 as opposed to the pivotal attachment described above.

As shown in FIGS. 4 and 5, the beam 30 comprises a plurality of support bars 37 arranged in a zig-zag configuration, each support bar 37 being rigidly attached at its upper end to an upper frame member 38 and rigidly attached at its lower end to a lower frame member 39. The lower frame member 39 preferably comprises a bar having a vertical cross section in the shape of an inverted T with a horizontally disposed ledge portion 40.

A plate member 41 is secured to the underside of the upper frame member 38. The permanent support leg 36 is hinged at 42 to the plate 41 so that the upper surface 43 of the leg 36 will abut against the lower surface of the plate 41 when the leg 36 is disposed in its vertical or supporting position.

A connector bar 44 is hinged at 45 to the leg 36. The opposite end of the bar 44 rests on the ledge portion 40. As indicated earlier, the permanent support leg 36 is preferably disposed as shown in FIG. 4 when the roof structure is in its folded configuration for transportation. The reason why the leg 36 is folded as shown in FIGS. 1, 2 and 4 is that the length thereof is too long to permit the leg to be disposed in a vertical position when the roof structure 21 is in its folded position inside a trailer 20.

As the permanent support leg is swung from its folded position shown in FIG. 4 to its supporting position as shown in FIG. 5, the leftmost end of the connector bar 44 slides along the ledge portion 40 until it drops into its final position as shown in FIG. 5 whereat the bar 44 becomes axially aligned with the lower frame member 39. At this position, the bar 44 is bolted at 46 to the lower frame member 39 thereby permanently positioning the leg 36 in a vertical or supporting position.

Each permanent support leg 36 is a telescoping leg including at least one section which telescopingly interfits with another section. For example, as shown in FIG. 5, the leg 36 includes a lower section 47 telescopically interfitting with an upper section 48. A pin, shown generally at 49 passes through both the upper section 48 and the telescopically interfitting lower section 47 thereby preventing the leg 36 from telescoping. It will be recognized by those of skill in the art that, while only one telescoping section is shown, each leg 36 may include one or more telescoping sections.

The permanent support legs 36 may be joined by a brace member, not shown, to provide lateral support for the legs and also cause both legs 36 to swing in unison between their parked or folded position and their vertical or supporting position. The brace is preferably located near the connection point between the legs 36 and the central section 24 so that the brace will not occupy a significant portion of the open area 32 when the roof structure 21 is being transported in a trailer 20.

After the temporary support legs 33 and 34 have been extended so as to provide temporary support for the roof structure 21 and the permanent support legs 36 are swung into position in a manner described in connection with FIGS. 4 and 5, then the contents of the area 32 can be unloaded from the trailer 20. A hoist mechanism is provided for this purpose. The hoist is illustrated best by FIGS. 3 and 3a and includes a beam 50 or the like extending longitudinally along the length of the roof structure 21 at a point preferably midway between the two side sections 25 and supported from above by the X-frames 31. A travelling hoist 51 is movably mounted on the beam 50. The hoist 51 is preferably manually operated, although a powered hoist could be used if a source of convenient power is available. The hoist 51 includes a downwardly extending cable 52 with a hook 53 or the like at the lowermost end of the cable 52 for hooking onto or otherwise engaging cartons and the like. Once the hook 53 is attached to a carton or the like, the hoist 51 is operated to lift the carton off the floor 29 of the trailer 20. Then, the hoist 51 is moved longitudinally along the beam 50 out of the trailer 20 to a position above the slab 23. Then the hoist 51 is operated to lower the carton onto the slab 23. In this manner, the entire contents of the area 32 can be easily unloaded from the trailer 20 onto the slab 23 without requiring power equipment such as lift trucks or the like. After the cartons and the like have been partially or completely unloaded from the trailer 20 and placed onto the pad 23, the trailer can be driven away.

After the trailer 20 is driven from the building site, the remaining permanent support legs 54, located at the forwardmost end of the roof structure 21 as viewed in FIGS. 1 and 3, are swung from their folded position to their vertical or supporting position and also preferably secured to the slab 23. These support legs 54 have the same structure and are attached to the roof structure 21 in the same manner as described earlier for legs 36.

In an alternative form, not shown, the permanent support legs are telescoping legs which are arranged in a vertical configuration at all times. Once the roof structure 21 is partially rolled from the trailer 20, then each permanent support leg can telescope downwardly until contact is made with the slab 23. Then, further telescoping is prohibited by a locking means such as a pin or the like passing completely through the telescoping sections. This alternative permanent leg structure, however, is somewhat more expensive than the preferred embodiment hereinabove described although from a functional point of view there is absolutely no difference.

Figure 6:
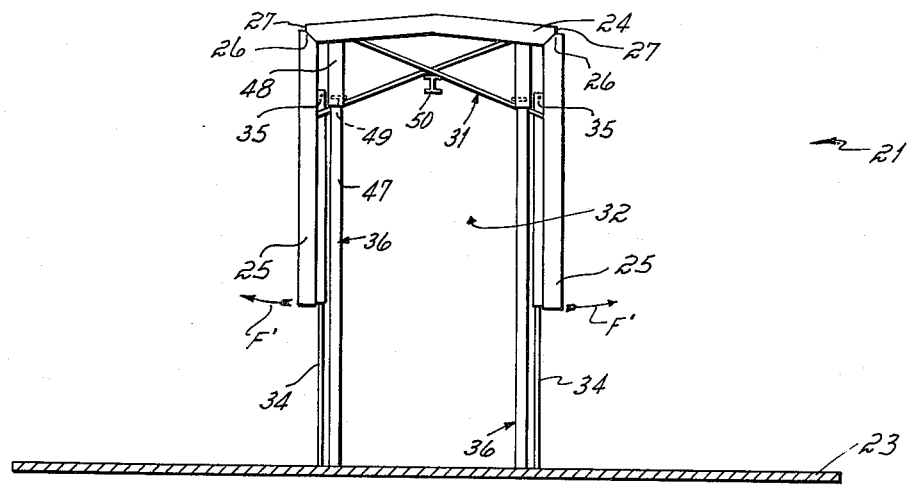
FIG. 6 is a schematic end view of the still folded roof structure in position at the building site.

Referring now to FIGS. 6 and 6a, the roof structure is shown in its folded position with the permanent support legs 36, 54 and the temporary support legs 33, 34 supporting the roof structure 21 on the pad 23. As mentioned earlier, the permanent support legs are telescoping legs, however, the legs are prevented from telescoping so long as the pins 49 are in position.

The vertical sectional view of FIG. 6a through the upper portion of the roof structure shows the side sections 25 disposed at their folded position. The side sections 25 each have at least one support bracket or bar member 55 hinged thereto as, for example, at 56. Each support bracket 55, as will become clearer later, is provided to hold the side roof section 25, to which it is hinged, in place once the side roof section 25 has been moved to its erect position. As noted earlier, the X frames 31 provide lateral support for the structure. The frame members 57 of X frame 31 are preferably made of an L bracket with a ledge 58. The support bracket 5 slideably rests on the ledge 58 of each frame member 55.

Figure 7:
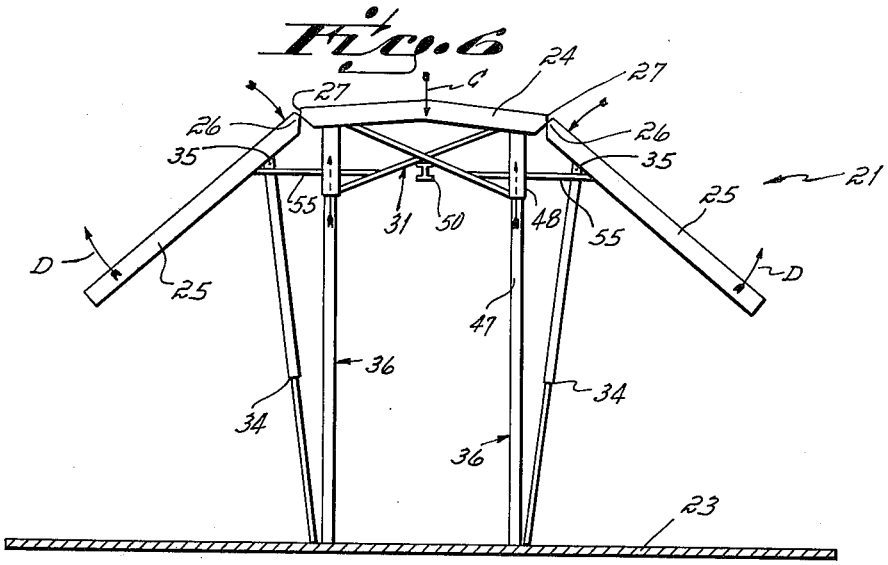
FIG. 7 is a schematic end view of the roof structure showing the side sections swung partially toward the erected position.

Referring now to FIG. 7, it will be recalled that the temporary support legs 33, 34 are pivotally attached at 35 to the underside of the side sections 25. When the pins 49 are removed from the permanent support legs 36 and 54, and the side sections swung by hand in the direction of the arrow F', the pivot point 35 moves outward of the hinge point 26 removing the toggle action tending to keep the side sections 25 in their vertical position. As this movement of the side section 25 occurs, the permanent support legs 36 and 54 telescope so that the central roof section 24 settles downwardly in a direction indicated generally by the arrow labeled C and the side roof sections swing outwardly in a direction indicated generally by the arrows labeled D. Consequently, some of the force of gravity which acts on the entire assembly and causes the central section to settle downwardly on the permanent support legs 36, 54 is converted to a raising force on each of the side roof sections 25. This raising force is operative to swing the side sections 25 upwardly from their folded position as shown in FIG. 6 towards their erect position as shown in FIG. 8.

As viewed best in FIG. 7a, the innermost ends of the support brackets 55 slide downwardly along the ledge 58 of the X frame members 57 as each side section 25 swings from its folded position toward its erect position. When the roof structure 21 reaches its fully erect position as shown in FIG. 8, the support brackets 55 are bolted at 59, as shown in FIG. 8a, to the lower beam member 39. In this manner, each side section 25 is locked in its erect position by the bracket 55, thus eliminating further need for the temporary support legs 33, 34. Therefore, these temporary support legs are telescoped and then swung to their parked position as shown in FIG. 8. The temporary support legs 33, 34 are held at their parked position as shown in FIG. 8 by any suitable means so that the legs do not extend downwardly into the area underneath the roof structure 21 once it has been completely erected.

Figure 8:
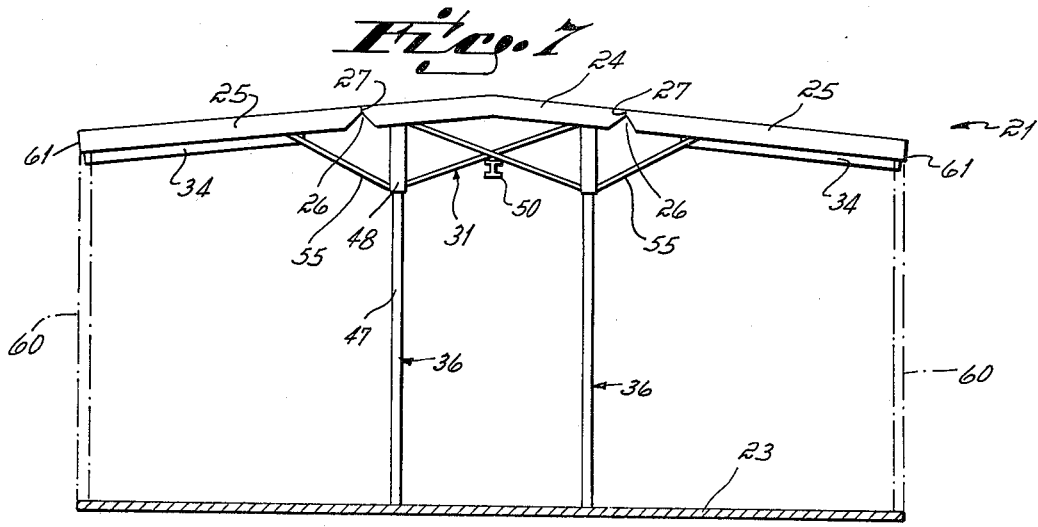
FIG. 8 is a schematic end view showing the roof structure of the invention at its fully erect position with temporary support legs disposed in their parked position.

Once the roof structure 21 has been erected as shown in FIG. 8, the workmen then can complete the building by installing prefabricated exterior walls, shown diagrammatically by the dotted line 60 which extends between the extreme edge of the side section 25, as shown generally at 61, and the concrete slab 23. In addition, end walls, as well as interior walls, floors and ceilings (not shown) can be installed. Since these walls, in the preferred embodiment, are made of lightweight modular construction, they can easily be installed by no more than two workmen using simple hand tools.

If the intent is to relocate the building at a later time, the modular walls are typically installed with easily removable fasteners. Usually a non-permanent ceiling, such as a panelized suspended type is utilized, and possibly modular unitized bathrooms, kitchens and the like may be employed for ease and speed of disassembly and reassembly of the building. These components are reloaded into the trailer by means of the hoist mechanism 51.

The roof structure 21 can be returned to its slightly elevated and folded position as shown in FIG. 6 by a reversal of the erection process described above. This is accomplished again by utilizing gravity as the side roof sections pivot at a point which effectively cause them to counterbalance the weight of the central portion of the structure.

Indeed, the whole roof structure can be carefully counterbalanced so that a small manually applied force is needed to fully raise the side roof sections from their folded to their erect position. In reversing the process, a manually applied force on the side roof sections will cause the roof structure 21 to fold. In either case, the force required is so small that two men, one for each side roof section, can easily erect a folded roof structure or fold an erected roof structure.

An alternative embodiment of the invention is shown in FIGS. 9–13. In this alternative approach, the temporary support legs 33, 34 are utilized only while the roof structure 21 is being unloaded from a trailer and, as soon as the permanent support legs 36 and 54 are in their vertical or supporting position, the temporary support legs are parked in a manner as described earlier. It will be recognized by those of skill in the art that, for the alternate approach shown in FIG. 9, the temporary support legs 33, 34 need not be attached to the underside of the side sections 25 but may alternatively telescope into the section 25 itself.

Figure 9:
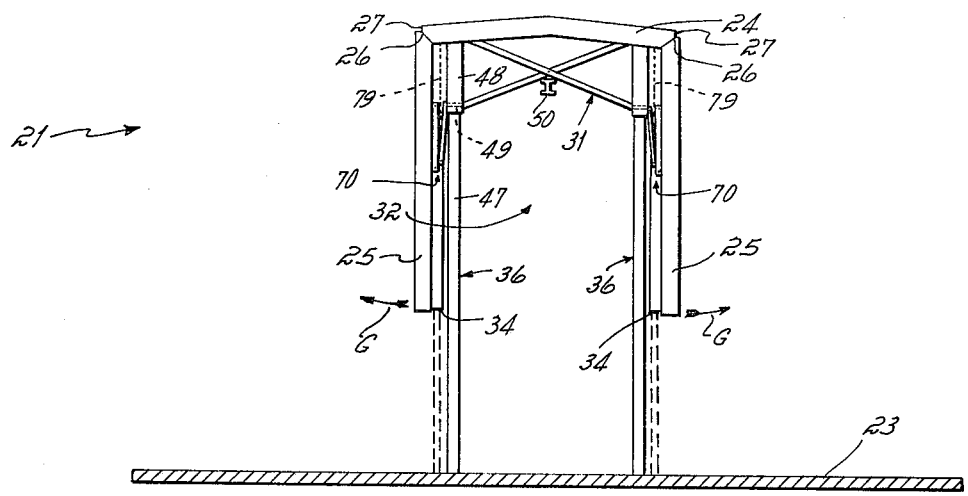
FIG. 9 is a schematic end view of a second embodiment of the roof structure of this invention after it has been unloaded from a trailer.
Figure 10:
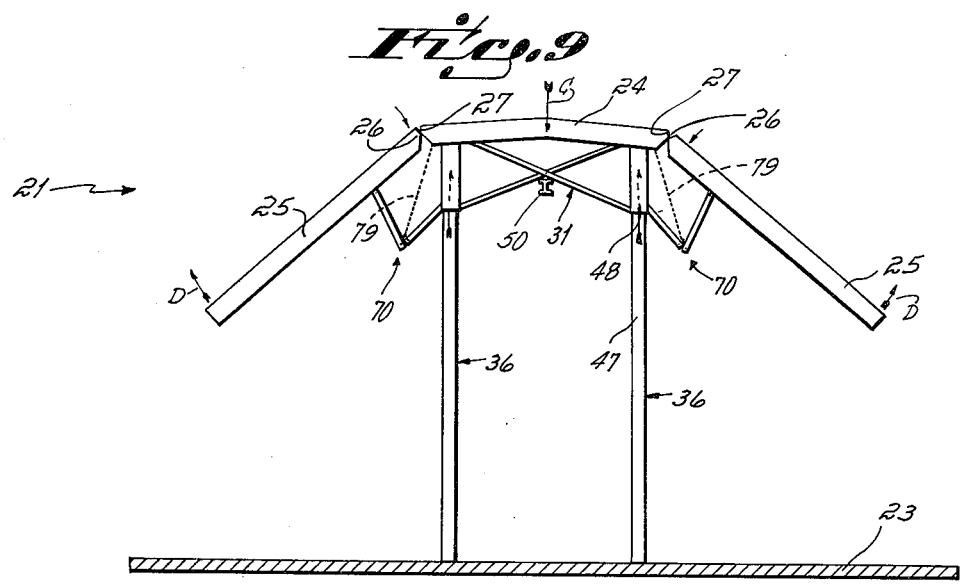
FIG. 10 is a schematic end view of the invention showing the side sections at their partially erect position.
Figure 11:
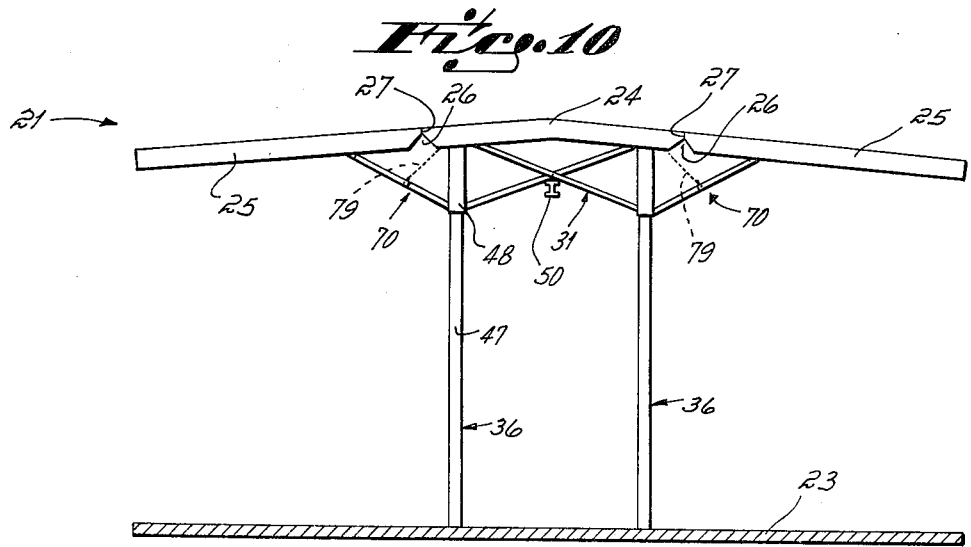
FIG. 11 shows a schematic end view of the roof structure of FIGS. 9 and 10 in its fully erect position.

After the permanent support legs 36 and 54 are in position and the temporary support legs 33, 34 have been parked, the roof structure 21, for the alternative embodiment, is positioned as shown in FIG. 9. After the pins 49 have been removed from the telescoping legs 36 and 54 (not seen in FIG. 9), the workmen, as will become clearer later, need only thrust the side sections 25 outwardly in a direction indicated by the arrows labeled G to thereby cause the central section 24 to move downwardly towards the slab 23 as the permanent support legs 36 and 54 telescope. This telescoping motion is converted by a cable, pulley and lever arrangement, hereinafter described in greater detail, to thereby shift the side sections from the folded position shown in FIG. 9 to the partially erect position shown in FIG. 10 and ultimately to the fully erect position as shown in FIG. 11. As such, the alternative roof structure 21 design is also self-erecting, i.e., no power equipment is necessary to swing the side sections 25 from their folded to their erect position, or visa-versa. This mechanical system provides a condition of general equalibrium, as does the first system described, between the gravitational force acting upon the side roof sections and that which acts upon the central portion of the structure.

Figure 9A:
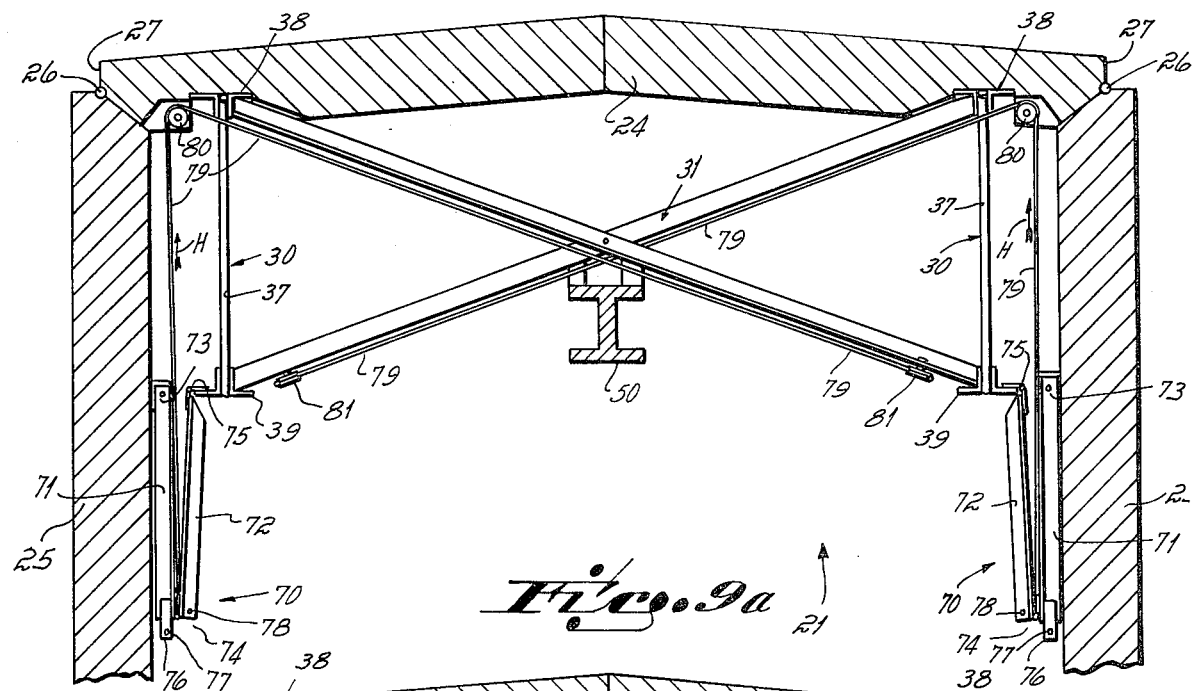
FIG. 9a is a vertical sectional view showing an alternative approach for raising and supporting the side roof sections.

Referring now to FIG. 9a, the alternate mechanism for pivoting or raising a side section 25 from their folded position to their erect position is shown. This side roof section pivoting means includes a pivoted erecting linkage 70 which interconnects each side roof section 25 with the center roof section 24. The pivoted erecting linkage 70 has an outer support bar section 71 and an inner support bar section 72. Each support bar section 71 and 72 is preferably made from an elongated metal bar or the like having an L-shaped cross section. The outer support bar section 71 is hinged at 73 to the underside of the side roof section 25. The opposite end of the outer support bar section 71, shown generally at 74, is hinged to one end of the inner support bar section 72. The opposite end of the inner support bar section 72 is hinged, as shown generally at 75, to the lower frame member 39.

The outer support bar section 71 has a flange portion 76 adjacent the hinged end 74 which, as will become clearer later, overlies the inner support bar section 72 when the two sections 71 and 72 are in axial alignment. Furthermore, the flange portion 76 has a hole 77 passing therethrough which becomes aligned with the hole 78 through the bar section 72 when the two bar sections 71 and 72 are in axial alignment. As such, a bolt or the like throgh these holes 77 and 78 will rigidly connect the bar sections 71 and 72 together.

Figure 13:
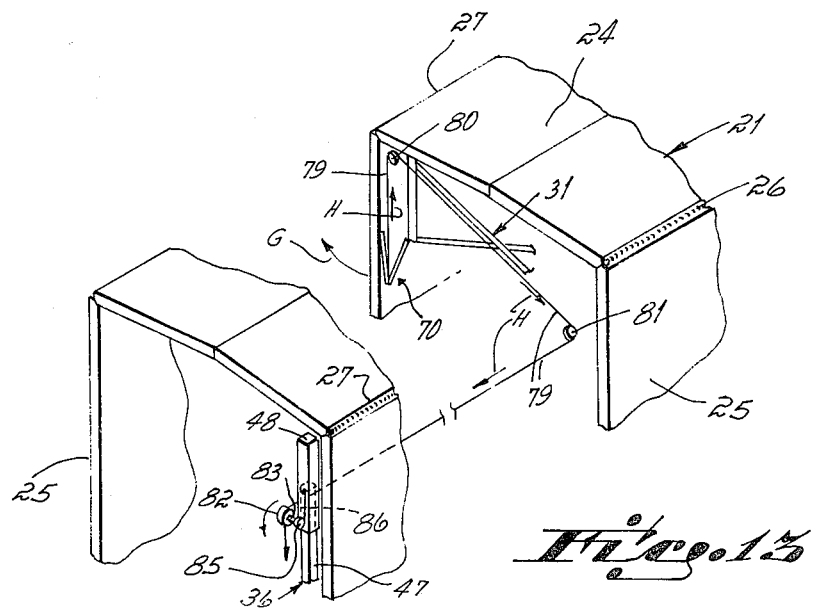
FIG. 13 is a schematic perspective view of the roof structure of FIGS. 9-12 showing the cable driving mechanism for converting telescoping motion of the permanent support legs to motion for raising the side roof sections from their folded condition to their erect position.

A cable 79 connects to the hinge at 74 at one end and passes upwardly over a pulley 80, located on the central section 24. After passing over the pulley 80, the cable 79 extends downwardly along the frame member 57 to an additional pulley 81. The cable then extends from the pulley 81, as best shown in FIG. 13, to a further pulley 82 rotatably mounted on the non-telescoping section 48 of one permanent support leg 36.

Figure 12:
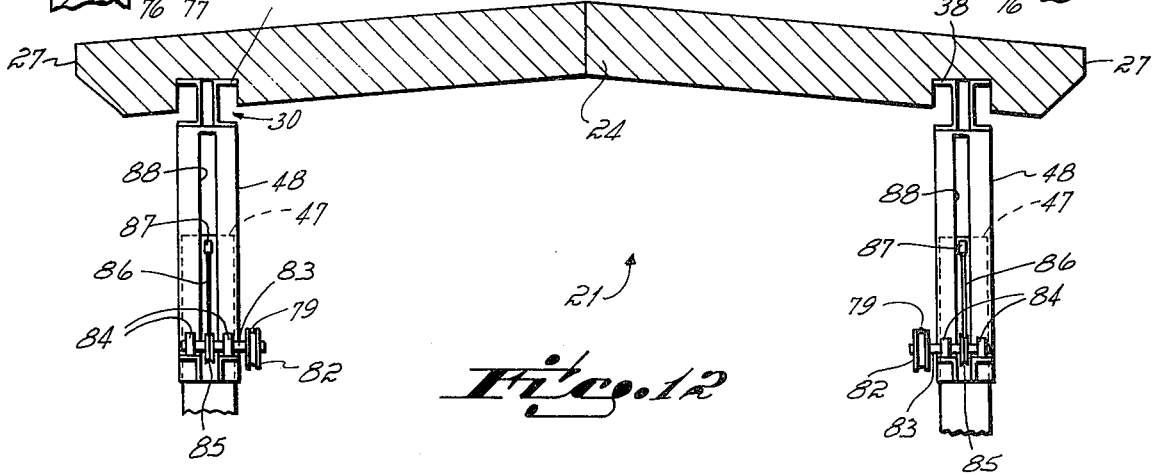
FIG. 12 is a sectional view showing the cable driving mechanism for converting telescoping motion of the main support leg into a force for applying tension to the cable so as to raise the side roof sections from their folded to their erect positions.

As best viewed in FIG. 12, each permanent support leg 36 has a pulley 82 rotatably mounted thereon. The pulley 82 is secured to an axle 83 which is rotatably mounted to the upper section 48 by two bushings or the like 84. Disposed between the two bushings 84 on the axle 83 is a further pulley 85. This pulley 85 has a cable 86 attached at one end to the pulley 85 and then wrapped therearound. The opposite end of the cable 86 is secured by any suitable attachment means shown at 87 to the upper end of the telescoping lower section 47 of the permanent support legs 36. The upper section 48 is slotted, as shown at 88, so that the attachment 87 can slide therein as the lower section 47 telescopes into the upper section 48 during erection of the roof structure 21.

The cable 79, pulleys 80, 81, 82 and 85 and the rod 71, 72 hereinabove described are operative in the following manner to convert the telescoping motion of the two support leg sections 47 and 48 into a force for raising the side sections 25 from their folded position as shown in FIG. 9 to their fully erect position as shown in FIG. 11. Once the pins 49 are removed from each of the permanent support legs 36, outward thrusting of the side sections 25 in the direction indicated by the arrows G in FIG. 9 is operative to start the telescoping of the lower section 47 into the upper section 48 of each permanent support leg 36. When this occurs, the cable 86 is unwound from the pulley 85 thereby causing the axle 83 to rotate. As the axle 83 turns, the pulley 82, to which the cable 79 is attached, turns so as to coil the cable 79 onto the pulley 82. This coiling action of the caable 79 onto the pulley 82 causes a force to be applied on the cable 79 in a direction shown generally by the arrows labeled H in FIG. 9a thus producing a force to move the side section 25 in a direction indicated by the arrow labeled G. As each side section 25 swings outwardly in a direction G toward its erect position, it will pass through an intermediate position shown by FIGS. 10 and 10a. Further telescoping action of the permanent leg section 47 and 48 is converted into a force to further raise the side section 25 to their fully erect position as shown in FIGS. 11 and 11a. It should be noted that the diameter of the pulleys 82 and 85 must be properly selected in order to provide the correct amount of cable takeup on the pulley 82 to thereby convert the distance that each permanent support leg 36 telescopes into the proper cable takeup to fully raise the side sections 25 to their erect position. As such, the cable 79 operatively interconnects the pivoted erecting linkage 70 with the one telescoping section of a leg 36 so that telescoping movement of a leg 36 is converted into pivoting movement of a side roof section 25 to move the section 25 from its folded to its erect position.

It is understood that the foregoing description of the cable, pulley and lever mechanism relating to permanent support legs 36 is duplicated for permanent support legs 54, and that the mechanisms work in unison as the central section 24 settles to raise the side roof sections 25 toward their erect position.

Once the side sections are at their erect position as shown in FIGS. 11 and 11a, the two support bar sections 71 and 72 become axially aligned, as previously indicated, and the overlapping flanges of the bar sections 71, 72 can be bolted together, as shown at 89, to thereby lock the two bar sections 71 and 72 together to form a rigid support for each side section 25. As such, the alternate approach shown in FIGS. 9–13 is also self-erecting as the side sections 25 are raised from their folded to their erect position by converting telescoping motion into pivoting motion without requiring power equipment.

In the alternate approach described above the selection of cables and pulleys as a preferred means of transferring the force generated by the gravity induced telescoping movement of the permanent support legs was based upon considerations of manufacturing cost. It is obvious to those skilled in the art that a gear could readily be substituted for pulley 85, with a gear rack mounted on telescoping lower section 47, engaging the gear, substituted for cable 86. It is further obvious that a gear operated shaft running the length of the roof structure, to which cable take-up pulleys are attached, could be substituted for another portion of the preferred pulley and cable mechanism.

From the foregoing description, it is clear that the described embodiments of the invention are operative to convert telescoping motion of the permanent support legs into a force for swinging the side roof sections 25 from their folded position as depicted, for example, in FIG. 9 to their fully erect position as depicted, for example, in FIG. 11. It will clear to those of skill in the art, however, that the mechanism shown for swinging the side sections 25 from their folded to their erect positions are merely exemplary of two different approaches for performing this function and that other approaches for performing this function are available. The foregoing and other modifications to the invention can readily be made without departing from the spirit and scope of the invention as defined by the following claims.

What is claimed is:

1. An easily transported, easily erected roof structure for a building comprising, in combination:

a central roof section having at least two opposed edges;

a plurality of legs connected to said central roof section and constructed to depend downwardly from said central roof section for supporting said central roof section spaced above a base, each said legs including at least two sections with one of each said leg section telescopically interfitting with at least one other leg section;

releasable means connected to the leg sections of each said leg to selectively lock said legs against telescopic movement when said releasable means are unreleased, and permit telescoping of each said support leg to enable said central roof section to move closer to said base under the force of gravity when said releasable means are released;

a pair of side roof sections each pivotally attached along an inner edge thereof to a different said opposed edge of said central roof section, each said side roof section having an outer edge and being pivotal between a downwardly folded position wherein said side roof section is disposed vertically in a generally perpendicular relation to said central roof section to facilitate compact storage and an erect position whereat said side roof section is pivoted upwardly relative to said folded position to form a continuous roof surface with said central roof section;

said releasable means when unreleased maintaining the length of said legs longer than the distance between the inner and outer edges of said side roof sections to permit said legs to support said central roof assembly at a predetermined height above said base with said outer edges of said side roof sections spaced above said base when said side roof sections are folded; and side roof section pivoting means directly connected to said side roof sections, operative in response to gravity-induced downward movement of said central roof section toward said base below said specified height accompanied by telescoping shortening movement of said support legs, to react against said downward movement on said side roof section in a direction to pivot said side roof section outwardly and upwardly relative to said central roof section from said folded position toward said erect position, whereby the energy required to move said side roof sections to said erect position from said stored position is obtained by a gravity-induced decrease in height of said central roof section upon selective release of said releasable means and consequent shortening of said telescoping legs.

2. The combination of claim 1 wherein said central roof section has a peaked central portion to promote gravity induced flow of fluid therefrom.

3. The combination of claim 2 wherein each said side roof section, when disposed at said erect position, forms a sloping continuous surface with said central roof section to promote gravity induced flow of fluid from the roof structure.

4. The combination of claim 1 wherein said means to selectively permit telescoping for each said leg comprises a removable means associated with each telescopically interfitting section, each removable means being operative to prevent telescopic movement when in place and permit telescopic movement when removed.

5. The combination of claim 1 additionally including
a transport vehicle having a flat bed slidably engaged with said outer edges of said side roof sections for temporarily supporting said side roof sections in their stored position with said central roof section spaced above said bed, and
a travelling hoist located beneath, and supported by, said central roof section, said hoist being disposed below said central roof section between said side sections when said bed and outer edges of said side sections are engaged and operative to lift objects off said bed and transport said lifted objects along said bed when said side roof section outer edges are engaged thereby.

6. The combination of claim 1 wherein said side roof section pivoting means includes at least two additional support legs having upper ends attached to different ones of said side roof sections and lower ends engageable with said base when said additional legs are disposed vertically for pivoting upwardly from its stored position to its erect position each said side roof section while said support legs telescope in a manner to cause each side roof section to pivot from its folded to its erect position when said central roof section is lowered under the force of gravity upon release of said releasable means and consequent shortening of said telescoping legs.

7. The combination of claim 1 additionally including permanent support means attachable between each said side roof section and said central roof section to permanently support each said side roof section at its erect position, said permanent support means being independent of said additional and telescoping legs.

8. The combination of claim 1 wherein said side roof section pivoting means includes at least one pivoted erecting linkage pivotally interconnected between each said side roof section and said central roof section and a cable operatively interconnecting each said pivoted erecting linkage with at least one said telescoping section to convert the shortening telescoping movement of said telescoping legs produced by gravity-induced lowering of said central section when said releasable means is released into movement of each said side roof section from its folded position toward its erect position.

9. The combination of claim 1 wherein said pivoting means includes:
at least one pulley rotatably mounted at a position which remains fixed with respect to said central roof section as said telescoping support leg telescopes, said pulley being drivably interconnected with said telescoping support leg so the telescoping movement of said support leg between its fully extended and its fully telescoped position when said central roof section lowers under the force of gravity is operative to rotate said pulley; and
a cable/linkage means interconnecting each said pulley with one said side roof section to pivot said connected side roof section between said folded position and said erect position as said support legs move telescopically between said fully extended and said fully telescoped position in response to gravity-induced lowering of said central roof section when said releasable means is released.

* * * * *

UNITED STATES PATENT OFFICE
CERTIFICATE OF CORRECTION

PATENT NO. : 3,924,366
DATED : December 9, 1975
INVENTOR(S) : Louis L. Gibbs

It is certified that error appears in the above-identified patent and that said Letters Patent are hereby corrected as shown below:

Column 2, line 8: "dedigns" should be --designs--.

Column 6, line 28: after the word "legs" insert the number --36--.

Column 9, line 26: insert the word "also" between the words "can" and "be".

Column 10, line 49: "throgh" should be --through--.

Column 11, line 22: "caable" should be --cable--.

Column 12, line 13: insert the word "be" between the words "will" and "clear".

Signed and Sealed this eighth Day of June 1976

[SEAL]

Attest:

RUTH C. MASON
Attesting Officer

C. MARSHALL DANN
Commissioner of Patents and Trademarks